United States Patent [19]

Hauser et al.

[11] Patent Number: 4,972,212

[45] Date of Patent: Nov. 20, 1990

[54] METHOD AND APPARATUS FOR CONTROLLING ION TRAJECTORY PERTURBATIONS IN IONOGRAPHIC DEVICES

[75] Inventors: Oscar G. Hauser, Rochester; Robert W. Anderson, Fairport; Lawrence M. Hart, Ontario; Steven B. Bolte, Rochester; Raymond W. Stover, Webster; Frank C. Genovese, Fairport, all of N.Y.

[73] Assignee: Xerox Corporation, Stamford, Conn.

[21] Appl. No.: 370,317

[22] Filed: Jun. 22, 1989

[51] Int. Cl.[5] ............................................ G01D 15/06

[52] U.S. Cl. .................................................... 346/159

[58] Field of Search ........................ 250/325, 326, 324; 346/153.1, 155, 158, 159; 355/214

[56] References Cited

U.S. PATENT DOCUMENTS

| | | | |
|---|---|---|---|
| 4,087,826 | 5/1978 | Haeberle | 346/159 X |
| 4,463,363 | 7/1984 | Gundlach et al. | 346/159 |
| 4,524,371 | 6/1985 | Sheridon et al. | 346/159 |
| 4,538,163 | 8/1985 | Sheridon | 346/155 |
| 4,562,447 | 12/1985 | Tarumi et al. | 346/159 |
| 4,584,592 | 4/1986 | Tuan et al. | 346/159 |
| 4,593,994 | 6/1986 | Tamura et al. | 355/35 C |
| 4,644,373 | 2/1987 | Sheridan et al. | 346/159 |
| 4,675,703 | 6/1987 | Fotland | 346/159 |
| 4,737,805 | 4/1988 | Weisfield et al. | 346/159 |
| 4,875,062 | 10/1989 | Rakov | 346/159 |

OTHER PUBLICATIONS

Xerox Disclosure Journal, "Ion Beam Deflection Electrodes for Ionographic Image Heads," E. J. Schneider; vol. 14, No. 2, Mar./Apr. 1989; pp. 55–56.

*Primary Examiner*—Donald A. Griffin
*Attorney, Agent, or Firm*—Mark Costello

[57] ABSTRACT

In an ionographic device projecting a stream of ions towards a moving imaging surface, modulated in imagewise fashion, one or more control electrodes may be arranged adjacent to the path of the ion stream and between the source of the modulated ion stream and the imaging surface, biased with a voltage preventing previously deposited charge from perturbing the trajectory of subsequently projected ions to limit the amount of ion beam deflection caused by the presence of electrostatic charge patterns on the electroreceptor.

27 Claims, 7 Drawing Sheets

METHOD AND APPARATUS FOR CONTROLLING ION TRAJECTORY PERTURBATIONS IN IONOGRAPHIC DEVICES

The present invention relates generally to controlling ion trajectory perturbations in ionographic devices, and more particularly to controlling ion projection with electrodes interposed between an ion generating device and an imaging surface.

INCORPORATION BY REFERENCE

U.S. Pat. No. 4,524,371 to Sheridon et al., U.S. Pat. No. 4,463,363 to Gundlach et al., U.S. Pat. No. 4,538,163 to Sheridon, U.S. Pat. No. 4,644,373 to Sheridon et al., U.S. Pat. No. 4,737,805 to Weisfield et al.

BACKGROUND OF THE INVENTION

In ionographic devices such as that described by U.S. Pat. No. 4,524,371 to Sheridon et al. or U.S. Pat. No. 4,463,363 to Gundlach et al., an ion producing device generates ions to be directed past a plurality of modulation electrodes to an imaging surface in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other ionographic devices exist which operate similarly, but do not not rely on a moving fluid stream to carry ions to a surface.

One problem affecting the control of image quality in ionographic devices is known as "blooming". Blooming is a phenomenon resulting from the effect of previously deposited ions or charge on the path of subsequent ions directed to the charge retentive surface. The problem is particularly noticeable when printing characters and edges of solid areas, resulting in character defects known as "rocking chair bottoms" (FIG. 1A), "undercutting" (FIG. 1B) and "trapezoids" (FIG. 1C), (with input bit maps shown in dashed lines).

U.S. Pat. No. 4,593,994 to Tamura et al. discloses an ion flow modulator for use in a photocopying machine, including a common electrode formed on one major surface of an insulating substrate and a plurality of ion control electrodes formed on the other major surface of the insulating substrate. U.S. Pat. No. 4,562,447 to Tarumi et al. discloses an ion modulating electrode for a recording unit of an electrostatic recording apparatus including one row of apertures capable of enhancing or blocking a passage of ion flow.

SUMMARY OF THE INVENTION

In accordance with the invention, in an ionographic printing system, there is provided a method and apparatus for controlling blooming on the imaging surface, by shaping the electric field in the imaging gap so that the effect of previously deposited charge on the trajectory of subsequently projected ions is minimized.

In accordance with one aspect of the invention, in an ionographic device projecting a modulated stream of ions in imagewise fashion towards a moving imaging surface, one or more control electrodes may be arranged adjacent to the path of the modulated ion stream and between the source of the modulated ion stream and the imaging surface, biased with a voltage, minimizing the effect of charge previously deposited into the image on the imaging surface on the trajectory of subsequently projected ions, to limit the amount of ion beam deflection caused by the presence of electrostatic charge on the imaging surface.

There is a strong electric field, limited by air breakdown, between the imaging surface and the control electrode, defined by $V_E/d$, where $V_E$ is the bias voltage of the electrode and d is the distance across the air gap from the electrode to the imaging surface. However, the presence of an image on the electroreceptor can deflect the ion beam only to the point where the control electrode intercepts the ion paths. Thus the amount of blooming is limited and the surface potential of the imaging surface can be controlled by the potential of the control electrode.

In accordance with another aspect to the invention, the biased control electrode may be arranged slightly downstream from the writing position, so that the moving imaging surface carries charged areas past the electrode, placing the electrode between the ion stream and the charged areas, thereby shielding the ion stream from the effect of the charged areas.

These and other aspects of the invention will become apparent from the following description used to illustrate a preferred embodiment of the invention read in conjunction with the accompanying drawings.

BRIEF DESCRIPTION OF THE DRAWINGS

With reference now to the drawings where the showings are for the purpose of illustrating an embodiment of the invention and not for limiting the same, FIG. 2 shows a schematic representation of a cross section of the marking head 10 of a fluid jet assisted ionographic marking apparatus similar to that described in commonly assigned U.S. Pat. No. 4,644,373 to Sheridon et al.

Figure 1A:
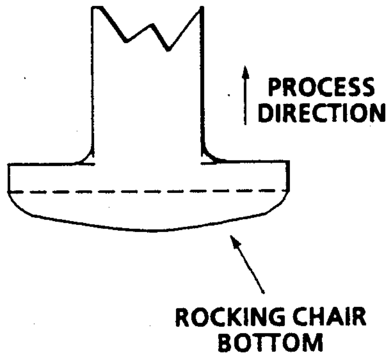
FIGS. 1A, 1B, and 1C demonstrate blooming artifacts noted in ionographic printing.
Figure 1B:
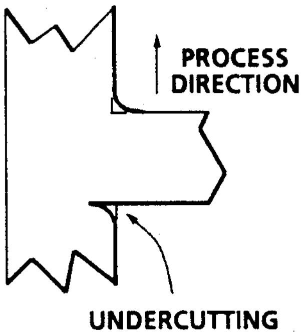
Figure 1C:
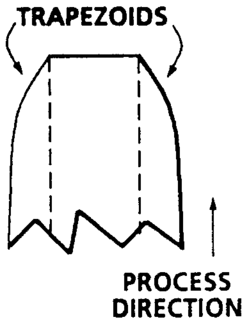

Within head 10 is an ion generation region including an ion chamber 12, a coronode 14 supported within the chamber, a high potential source 16, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air) into chamber 12 from a suitable source, schematically illustrated by tube 22. A modulation channel 24 conducts the transport fluid out from ion chamber 12 to the exterior of the head 10. As the transport fluid passes through ion chamber 12, it entrains ions and moves them into modulation channel 24, past modulation electrodes 28. The interior of ion chamber 12 may be provided with a coating that is inert to the highly corrosive corona byproducts produced therein.

Ions allowed to pass out of head 10, through modulation channel 24, and directed to charge receptor 34, come under the influence of a conductive plane 30, provided as a backing layer to a charge receptor dielectric surface 31, with conductive plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown).

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 and a reference potential 37 by means of a switch 38. While the switching arrangement shown produces a binary imaging function, grey levels may be provided by providing a continuously variable voltage signal to the modulation electrodes. The modulation electrodes are arranged on a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36, may be applied, when connected through switch 38. Thus, an electric field, extending in a direction transverse to the direction of the transport fluid flow, is selectively established between a given modulation electrode 28 and the opposite wall 50.

"Writing" of a selected spot is accomplished by connecting a modulation electrode to the reference potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation voltage is applied to an electrode. This is accomplished by connecting the modulation electrode 28 to the low voltage potential of source 36 via switch 38 so as to impose upon the electrode a charge of the same sign as the ionic species. The ion "beam" will be repelled and be driven into contact with the opposite, conductive wall 50 where the ions neutralize into uncharged, or neutral air molecules. Thus, an imagewise pattern of information is formed by selectively controlling each of the modulation electrodes on the marking array so that the ion "beams" associated therewith either exit or are inhibited from exiting the housing, as desired. For simplicity and economy of fabrication over the large area, full pagewidth head, thin film techniques are used. Thin film silicon, in either the amorphous, polycrystalline or microcrystalline forms, has been the material of choice for the active devices. The relatively low temperature of the amorphous silicon and polysilicon fabrication processes allows a large degree of freedom in the choice of substrate materials, enabling the use of inexpensive amorphous materials such as glass, ceramics and possible some printed circuit board materials.

As an alternative to an ionographic printing head with fluid jet assisted ion flow, it will no doubt be appreciated that other ionographic print heads may be provided where the ion stream could be field directed to the charge receptor. Further, while the description herein assumes positive ions, appropriate changes may be made so that negative ions may be used.

Figure 2:
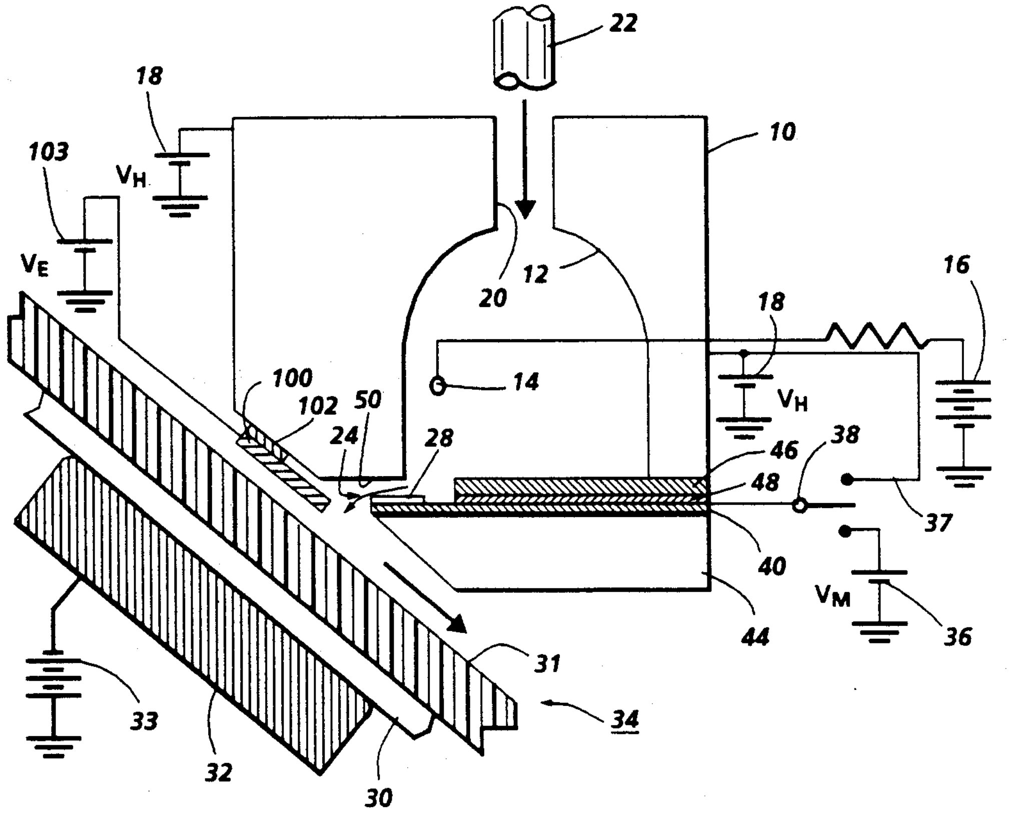
FIG. 2 schematically shows an ionographic print head of the type contemplated for use with the present invention, in printing relationship with an imaging surface.
Figure 3:
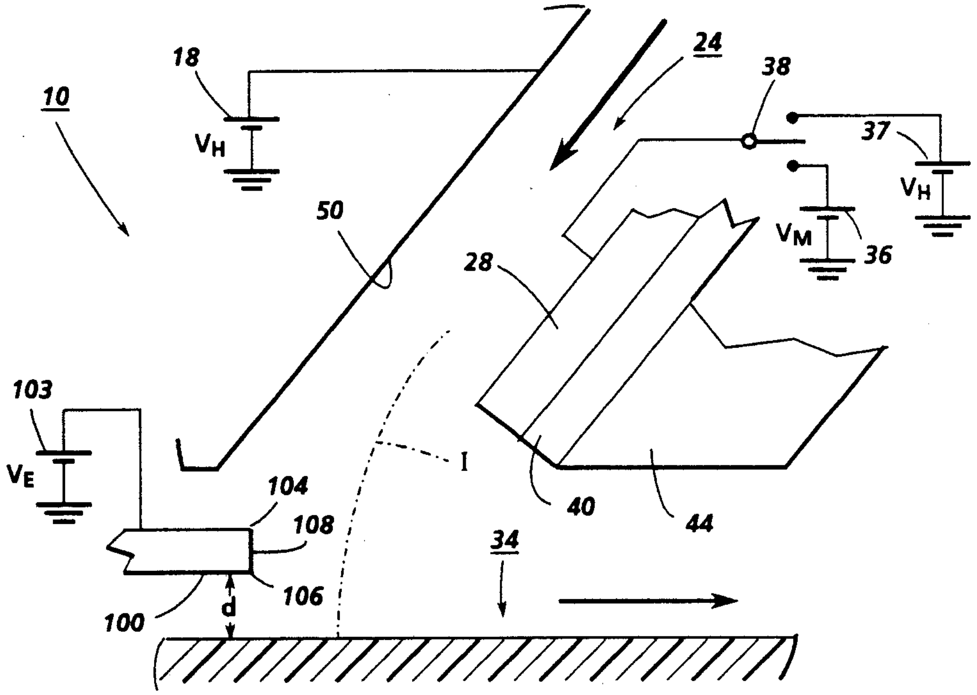
FIG. 3 shows an embodiment of the invention in an ionographic printing head.

In accordance with the invention, and as shown in FIGS. 2 and 3, one or more control electrodes 100, supported on insulative support 102, are interposed between the printing head 10 and charge receptor 34, adjacent to the writing position, and extending across charge receptor 34, transverse to the direction of movement thereof, to limit the amount of ion beam deflection caused by the presence of electrostatic charge on the electroreceptor. FIG. 3 shows a configuration with a conductor as the control electrode 100, with a generally rectangular cross section having a voltage $V_E$ from a power source 103 applied thereto, where $V_E$ is a voltage between O and $V_H$, the voltage of print head 10. In this configuration the ion beam (indicated generally as I) is at first directed toward upper edge 104 of electrode 100, in the region between electrode 100 and wall 50, because $V_H > V_E$. However, before any charge accumulation occurs, the image voltage $V_i$ is equal to 0 at all points and the electric field in the region between the electrode 100 and charge receptor 34 from the lower edge 106 of the control electrode deflects the ion beam away from the electrode. There is a strong electric field between the charge receptor and the control electrode, $V_E/d$, where d is the distance across the air gap to electrode 100 from the charge receptor 34, limited by air breakdown. However, as charge is deposited by the ion beam, the presence of an image on the charge receptor 10 can deflect the ion beam only to the point where the control electrode 100 intercepts the ion paths. Thus the amount of blooming is limited and the limiting surface potential of the electroreceptor can be somewhat less than, and at most equal to the potential of the control electrode.

Figure 4:
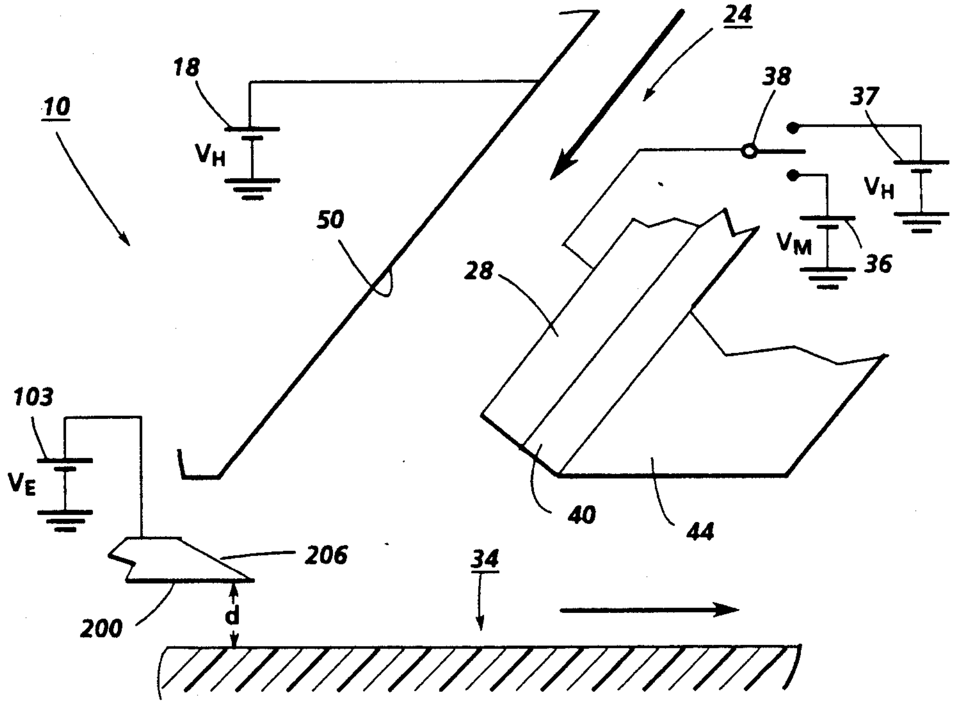
FIG. 4 shows another embodiment of the invention with a shaped control electrode in an ionographic printing head.

FIGS. 3 and 4 illustrate alternative shapes of control electrodes 100 and 200. The shape of the electrode may be chosen to optimize the control electrode's effect on blooming in any particular configuration. Thus, electrode 100 in FIG. 3 may have a face 108 perpendicular to the charge receptor 34, while electrode 200 in FIG. 4 may have a face 206 at some other angle with respect to the charge receptor.

With the configuration of FIG. 4 and $V_M = V_H = 2000$ volts, $V_E = 1000$ volts, d=10 mils (approximately) and 30 mils from head to electroreceptor, a reduction in blooming by a factor of 2 has been estimated, from electric field calculations over the case where there is no electrode and $V_H = 2700$ volts and the head to electroreceptor spacing is 30 mils.

Figure 5:
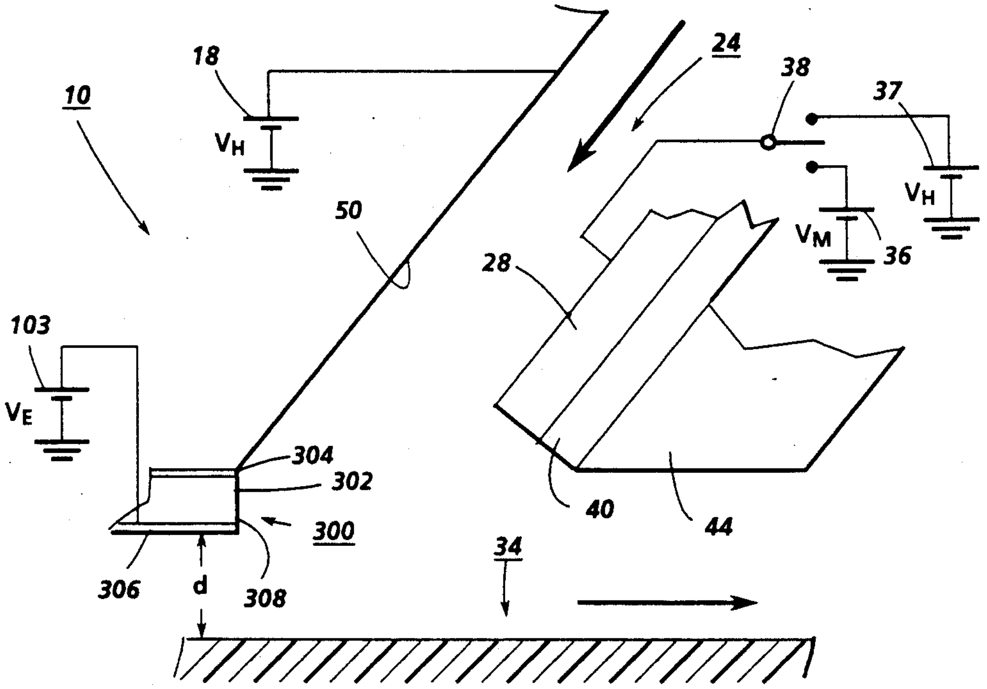
FIG. 5 shows yet another embodiment of the invention with a control electrode formed with a dielectric having a metalized surface.

Alternative electrode arrangements and structures are well within the scope of the invention. As shown in FIG. 5, an electrode 300 of metalized plastic or having some other dielectric support 302 (glass, ceramic, etc.), may be fixed directly on the print head 10 with an adhesive layer 304, with $V_E$ applied to a conductive surface layer 306 facing opposing charge receptor 34. Dielectric support 302 is used to control the spacing of electrode 306 from charge receptor 34. Controlled electric fields exist between the print head 10 and electrode 306, so that spurious charging of the substantial vertical dielectric surface 308 is avoided, eliminating the potential of history effects or ghosting.

Figure 6:
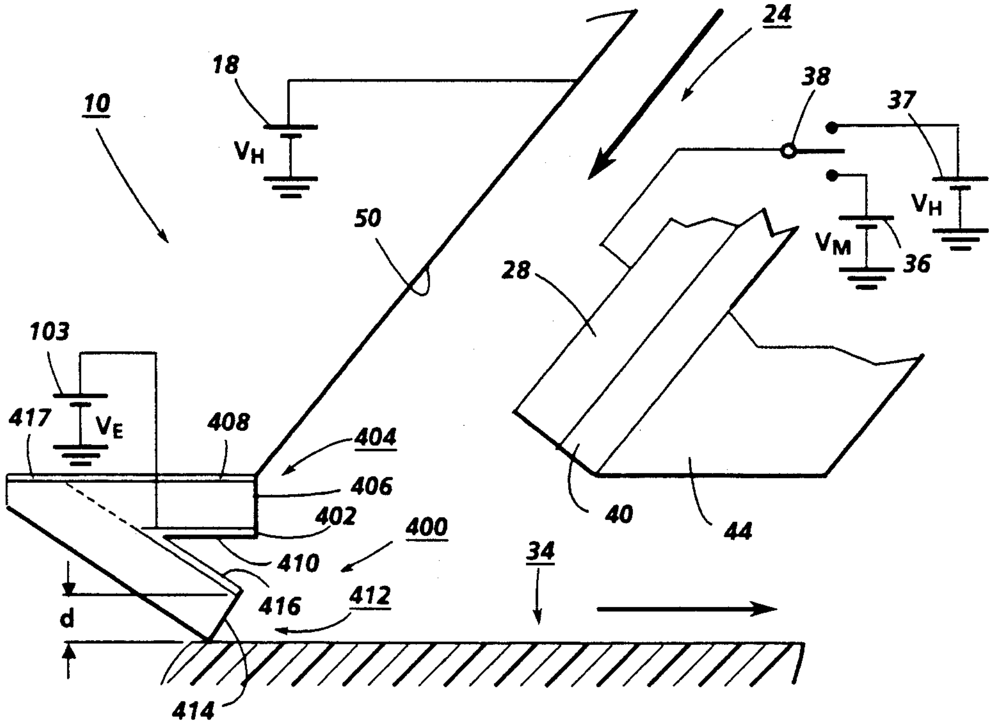
FIG. 6 shows still another embodiment of the invention with a control electrode formed with a dielectric having a metalized surface, and having a member conformably riding on the imaging surface.

Another way of controlling electric fields at the writing position between the print head 10 and the charge receptor 34, and allowing for charge receptor run-out, as shown in FIG. 6, is to provide an electrode arrangement 400, in which the electrode is arranged on a support and rides more or less conformably on the charge receptor. Accordingly, in one such embodiment, a conductive surface layer 402 connected to voltage supply 103 with potential $V_E$ applied, is formed onto two support portions. A first support portion 404 includes dielectric layer 406 adhered with adhesive layer 408 to a fixed position on the exterior of print head 10 and supporting first portion 410 of conductive surface layer 402 facing charge receptor 34. Second support portion 412, including dielectric layer 414 supports second portion 416 of conductive surface layer 402 facing away from the charge receptor 34. Second support portion 412 is flexibly supported so that dielectric layer 414 conformably rides along the charge receptor surface. A variety of arrangements allowing this structure is possible, and in the described embodiment, dielectric layer 414 may be simply a flexible member adhered with an adhesive layer 417 at a distal portion thereof, to the head. Allowing second support portion 412 to ride along the charge receptor surface allows the electrode, i.e., second portion 416 of conductive surface layer 402 supported thereon, to be maintained at a constant distance from charge receptor 34. Both portions 410 and 416 of conductive surface layer 402 are in contact with the same voltage source $V_E$ so that even though an air gap might exist between portions 410 and 416, there is no field between them. In fact, there is a repulsive force between portions 410 and 416 insuring contact with the charge receptor, and thus stability of the electrode to electroreceptor dimension and the field at the imaging surface. The air gap distance d therefore remains constant. The two electrode support portions need not be the same material or the same thickness. For example the upper support portion might be DELRIN which is machinable and easily adhered to the head by conventional adhesives and the lower flap might be metalized MYLAR, TEFLON, polycarbonate etc. where the electroreceptor/dielectric interaction can be minimized or eliminated by material choice. Of course, while conductive surface layer 402 is shown as a signle layer, for the purpose of illustrating connection to a single voltage potential, it could easily be provided as two separate conductors.

Figure 7:
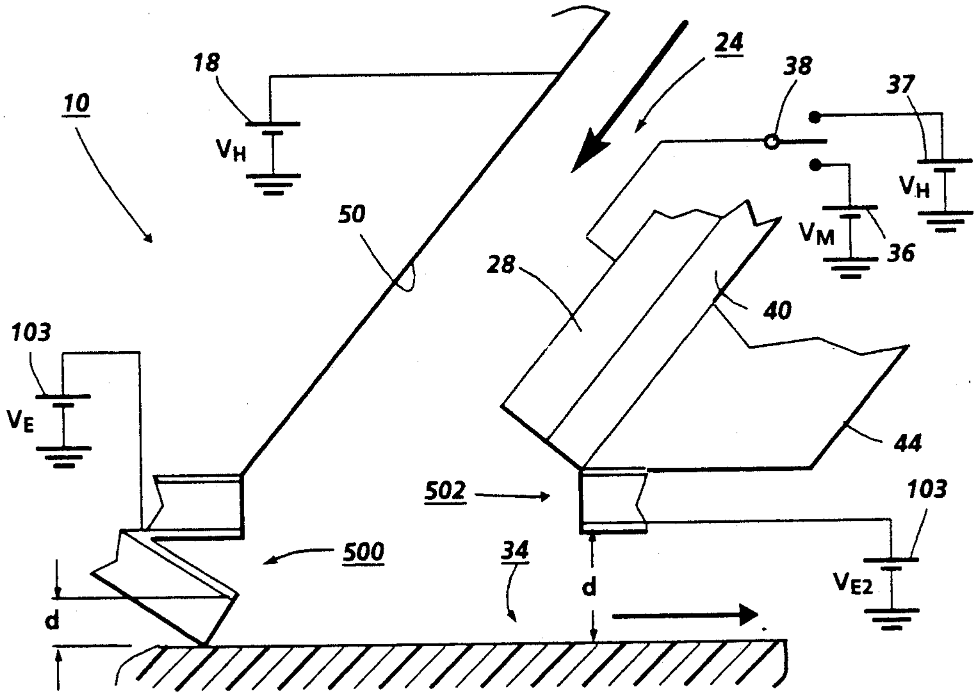
FIG. 7 shows an embodiment of the invention having electrodes on upstream and downstream sides of the writing position of the head.

In accordance with another aspect of the invention, and as shown in FIG. 7, field shaping control electrodes may be arranged on both sides of the writing position, with conformably riding electrode arrangement 500 biased with a voltage $V_E$ supported at an upstream position from the writing position and fixed position electrode 502 biased with a voltage $V_{E2}$ supported at a downstream position. While any of the previously described arrangement may be useful in the described configuration, it will be appreciated that if the conformably riding electrode 500 is utilized in both upstream and downstream positions, there may be interference with the airflow carrying ions to the charge receptor. Of course, if there is no airflow, this will not be a problem. It will no doubt be appreciated that $V_E$ and $V_{E2}$ may or may not be the same value for both electrodes, in accordance with the desired trajectory of ions.

Figure 8:
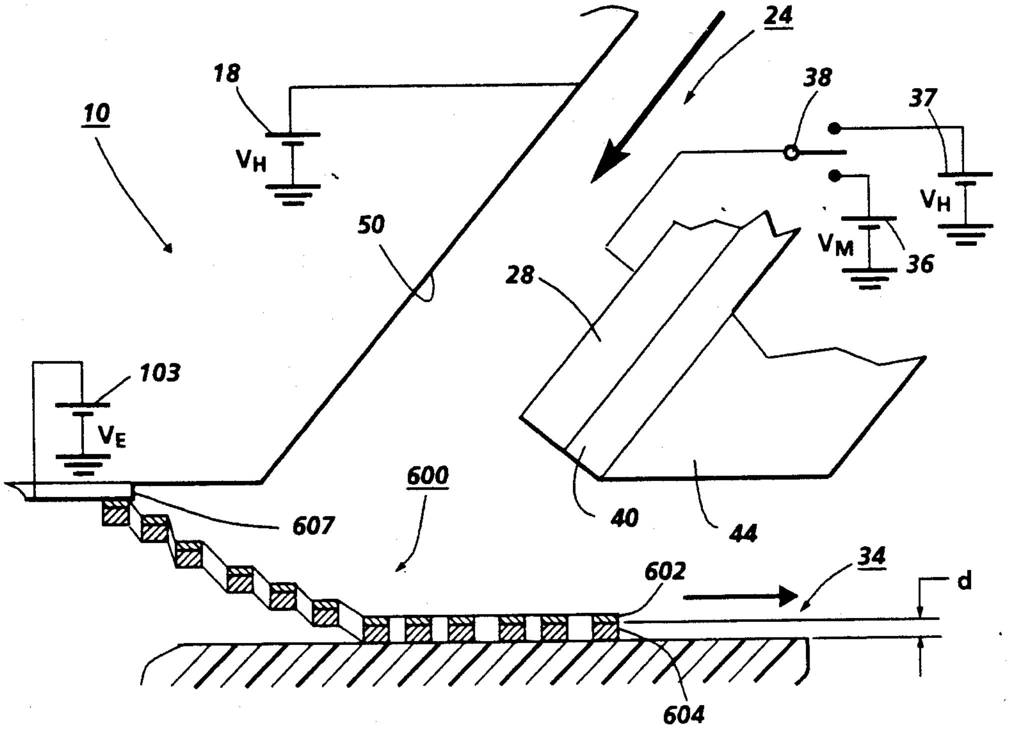
FIG. 8 shows a screen electrode embodiment for use in the invention.

In yet another embodiment as shown in FIG. 8, a screen electrode 600 conformably rides over the charge receptor 34 and ions are projected through the screen. The frequency of screen electrode 600 should be higher than the desired spot addressability, and screens with these structures are readily available (e.g. 25 $\mu$m openings are not uncommon). Screen 600 may have a first conductive surface 602 facing the ion head and a second insulating surface 606 facing the charge receptor 34. Screen 600 can be made relatively flexible to ride on the electroreceptor even with run out and other mechanical "noise", and can be mounted on the exterior surface of head 10 in a variety of ways. The screen is shown simply adhered via an insulating member 607 to the exterior face of head 10 from an upstream position, thereby maintaining insulation from the head. The screen will reduce blooming via two mechanisms. The conductive upper layer will shield each cell from charge in neighboring cells, and the microfields, due to a bias on the conductive side of the screen, tend to be stronger in each cell than the same region with only the normal electric field. As with a scorotron the image potential is limited to the screen potential. Additional benefits of the screen approach are that no critical alignment is necessary relative to the ion head (the ions need only be projected through the screen) and blooming will be reduced simultaneously in all directions. In a configuration using a screen, the screen should be mounted at the opening to present a screen pattern that is angled and overlapping to avoid streaking.

Figure 9:
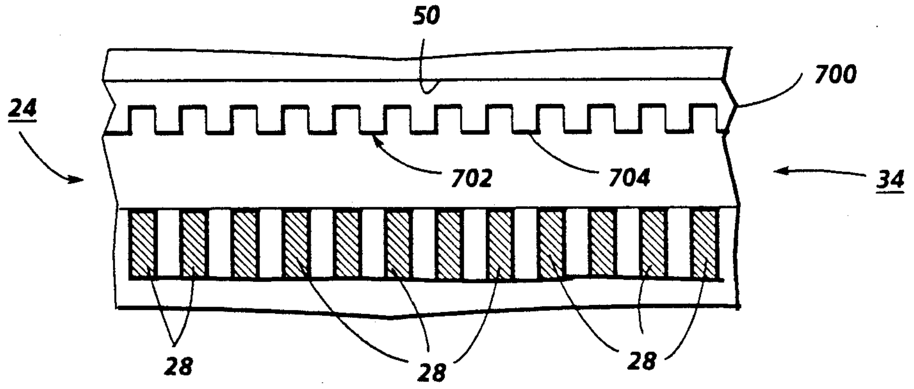
FIG. 9 shows still another electrode embodiment where the electrode has a serrated edge.

While the configurations shown in FIGS. 1–7 control blooming in the process direction, blooming perpendicular to the process direction (sometimes known as lateral blooming) can also be controlled by electrodes in the screen electrode arrangement as shown in FIG. 8 or if the control electrodes have a comb-like or serrated edge. As shown in FIG. 9, modulation electrodes 28 extend parallel to, and across charge receptor 34, transverse to the direction of movement thereof. As shown, modulation electrode 28 are a plurality of individual nib structures, individually addressable to modulate the ion stream for the creation of an intelligible charge pattern on charge receptor 34. In accordance with the invention, for the prevention of lateral blooming, the control electrode 700 may have a comb-like or serrated edge 702, with electrode projections 704, extending outwardly a position corresponding to interelectrode spaces.

Figure 10A:
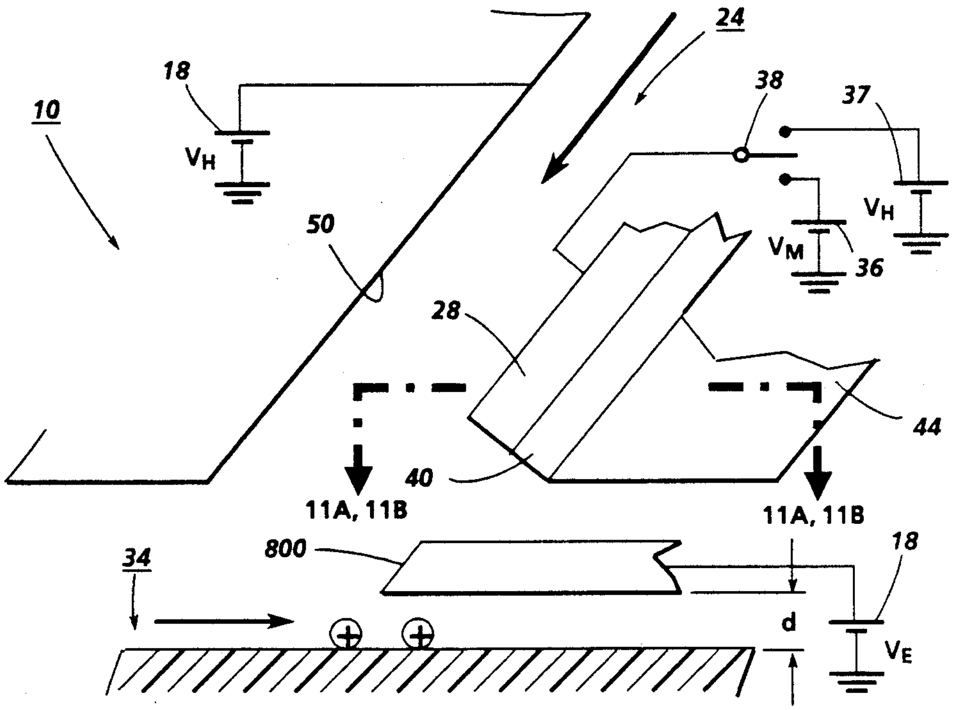
FIGS. 10A and 10B show other embodiments of the invention having a control electrode on a downstream side of the writing position of the head.
Figure 10B:
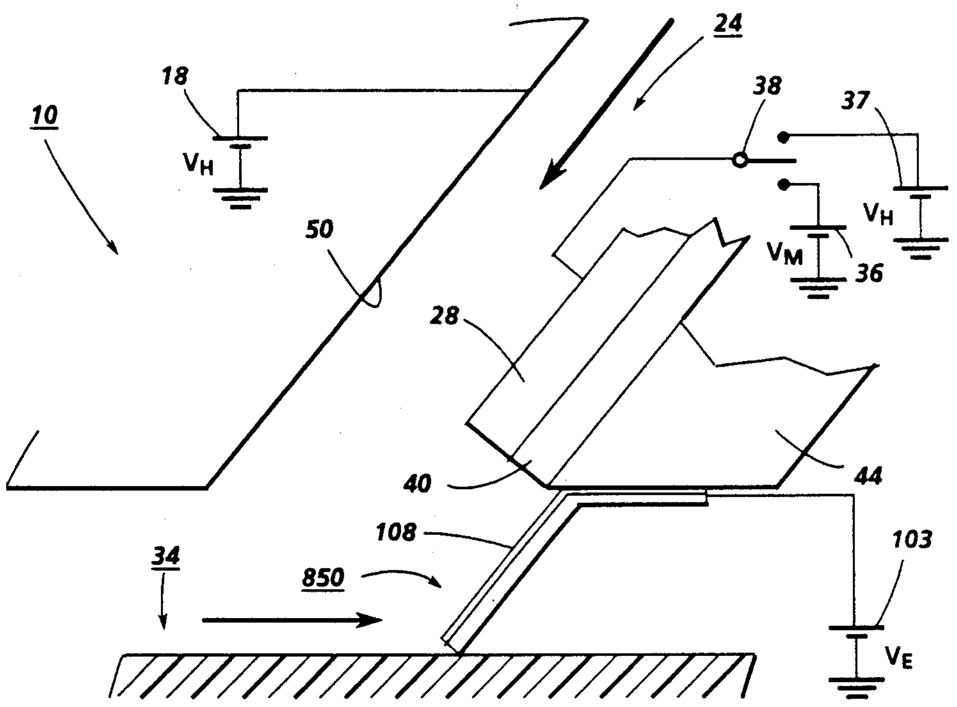
Figure 11A:
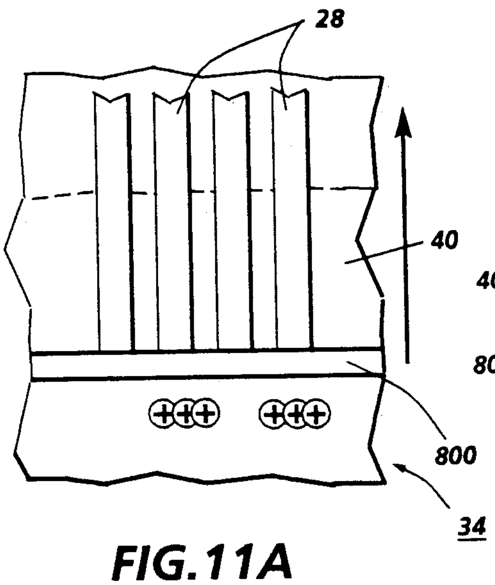
FIGS. 11 and 11A show the operation of the invention with the control electrode on an downstream side of the writing position of the head.
Figure 11B:
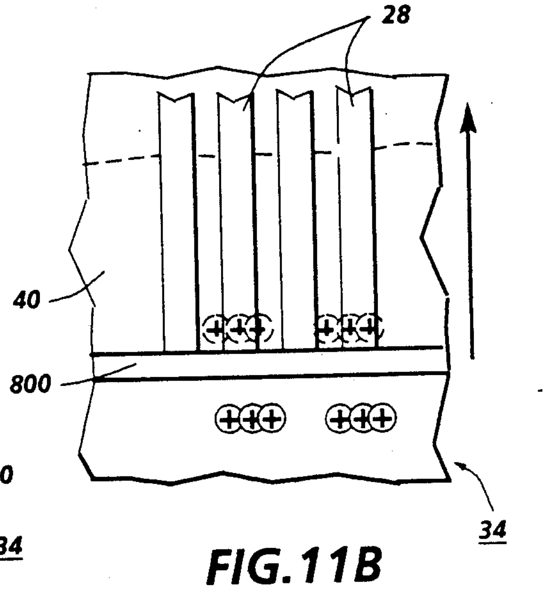

In accordance with another aspect of the invention, and as demonstrated in FIG. 10A, the control electrode 800 may be arranged on the downstream side of the writing position of the head 10. Then, as characters are written to charge receptor 34, the charged areas move under control electrode 800, and have no effect on subsequent charge being written to the charge receptor, as demonstrated in FIGS. 11 and 11A. In accordance with FIG. 10B, the control electrode 850 may be arranged on the downstream side of the writing position of the head 10, in conformable contacting relationship with the charge receptor 34, formed from a piece of aluminized MYLAR or other dielectrics, with the metalized surfaces held at the control voltage.

Figure 12:
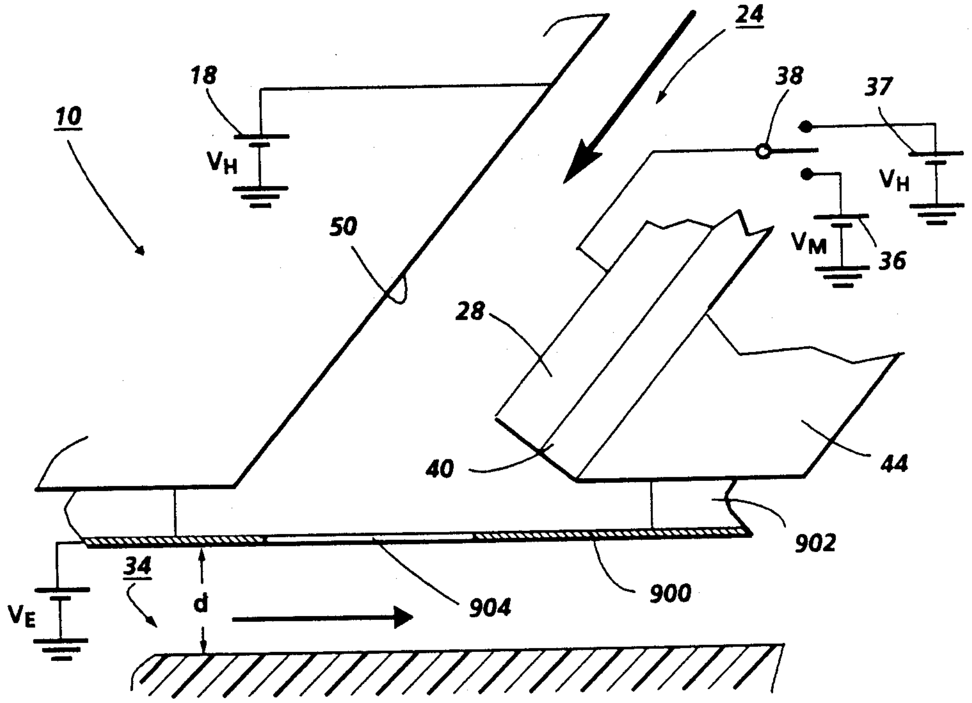
FIG. 12 shows yet another embodiment of the invention where the control electrode is a screen with openings for the ions to pass through to the imaging surface.

In accordance with yet another aspect of the invention, and as shown in FIG. 12, to control the electric fields, a screen electrode 900, biased with a voltage potential $V_E$, supported across exit opening 24 on screen supports 902 arranged upstream and downstream, form the exit opening. A plurality of holes 904 formed in screen 900 allow passage of ions through the screen. The screen shields the opening from the electric field and confines the electric fields to the volume directly above the charge receptor 34. Ions tend to be focused at the screen opening. The screen may be a simple etched conducting film with holes having a diameter larger than ion exit aperture.

The described electrode support structures are dielectrics. However, if the adhesive is electrically conducting, then the support structures and/or the electrodes could also be made of resistive materials with some advantages, including the ability to tailor spatial potential distributions in the trajectory region.

The invention has been described with reference to a preferred embodiment. Obviously modifications will occur to others upon reading and understanding the specification taken together with the drawings. Various alternatives modifications, variations or improvements may be made by those skilled in the art from this teaching which are intended to be encompassed by the following claims.

We claim:

1. In an ionographic imaging device, including a source of ions, means for moving ions towards a moving imaging surface to create a pattern of charge thereon, modulation means to modulate the ion stream in imagewise fashion for the formation of intelligible charge patterns on the imaging surface, means to develop the charge pattern on the imaging surface, and means for controlling the stream of ions projected towards the imaging surface to prevent charge previously deposited on the imaging surface from affecting the path of the modulated stream of ions to the imaging surface, the control means comprising:

a control electrode supported adjacent the ion stream path, and between the modulating means and the imaging surface; and a voltage source, connected to the electrode, and applying a voltage thereto of magnitude and polarity sufficient to deflect the modulated stream of ions, whereby the effect of charge previously deposited on the imaging surface is prevented from affecting the path of the modulated stream of ions to the imaging surface.

2. The device as defined in claim 1, wherein the electrode is arranged downstream, with respect to the imaging surface movement, from the ion stream path.

3. The device as defined in claim 1, wherein the electrode is arranged upstream, with respect to the imaging surface movement, from the ion stream path.

4. The device as defined in claim 1 including a second electrode, the first and second electrodes are arranged respectively upstream and downstream with respect to the imaging surface movement, from the ion stream path.

5. The device as defined in claim 1, wherein the conductive electrode has an electrode face arranged generally adjacent and parallel to the ion stream.

6. The device as defined in claim 1, wherein the conductive electrode has first and second edges supported adjacent to the ion stream, the second edge supported more closely to the imaging surface than the first edge, and the second edge supported more closely to the ion stream than the first edge.

7. The device as defined in claim 1, wherein the conductive electrode has first and second conductive portions each connected to the voltage source, the first portion supported at a fixed position with respect to the ion stream path, and the second portion supported at a relatively fixed position with respect to the imaging surface.

8. The device as defined in claim 1, wherein the conductive electrode is a conformable member riding on the imaging surface, the conductive electrode having an electrically insulating surface layer riding on the imaging surface to electrically insulate the electrode therefrom.

9. The device as defined in claim 8 wherein the conductive electrode is supported across the path of the ion stream, interposed between the ion source and the imaging surface, the electrode including a plurality of openings allowing ions to pass therethrough to the imaging surface.

10. In an ionographic imaging device, including a body forming an ion chamber having an entrance opening and an exit opening and supporting an ion source therewithin, fluid jet means for creating a fluid flow through the entrance opening into the ion chamber and out the exit opening to entrain and carry ions produced at the ion source to an imaging surface moving in a process direction, modulation means at the exit opening to modulate the stream of ions moving therepast to the imaging surface in imagewise fashion, means to develop the charge pattern on the imaging surface, and means for controlling the stream of ions projected towards the imaging surface to prevent charge previously deposited on the imaging surface from affecting the path of the subsequent modulated stream of ions to the imaging surface, the control means comprising:

a control electrode supported adjacent the exit opening at a position adjacent the ion stream path, and between the exit opening and the imaging surface;

a voltage source, connected to the electrode, and applying a voltage thereto of magnitude and polarity sufficient to deflect the modulated stream of ions towards the electrode, whereby the effect of charge previously deposited on the imaging surface is prevented from affecting the path of the modulated stream of ions to the imaging surface.

11. The device as defined in claim 10, wherein the control electrode is arranged downstream, with respect to the imaging surface movement, from the ion stream path.

12. The device as defined in claim 10, wherein the control electrode is arranged upstream, with respect to the imaging surface movement, from the ion stream path.

13. The device as defined in claim 10, wherein the control electrode has an electrode face arranged generally adjacent and parallel to the ion stream.

14. The device as defined in claim 10, wherein the control electrode has first and second edges supported adjacent to the ion stream, the second edge supported more closely to the imaging surface than the first edge, and the second edge supported more closely to the ion stream.

15. The device as defined in claim 10, wherein the control electrode has first and second conductive portions each connected to the voltage source, the first portion supported at a fixed position with respect to the ion stream path, and the second portion supported at a relatively fixed position with respect to the imaging surface.

16. The device as defined in claim 10, wherein the control electrode is supported to conformably ride on the imaging surface, the conductive electrode having an electrically insulating surface layer in contact with the imaging surface to maintain the electrode at a fixed spacing therefrom.

17. The device as defined in claim 16 wherein the control electrode is supported across the path of the ion stream, interposed between the ion source and the imaging surface, the electrode including a plurality of openings allowing ions to pass therethrough to the imaging surface.

18. The device as defined in claim 10, wherein the modulation means at the exit opening includes an array of control nibs, each control nib connected through a switch to a marking voltage source, each switch biasable to control the voltage at the control nib, whereby the portion of the ion stream passing by the control nib is modulated;

the control electrode having an array of electrode projections along the face parallel to the ion stream, each projection corresponding in position along the path of ion flow to the space between adjacent control nibs, whereby the effects of previous charge deposited on the imaging surface is corrected in the process direction and a direction transverse to the process direction.

19. The device as defined in claim 10, including a second control electrode, the electrode arranged upstream and downstream from the ion stream with respect to the imaging surface movement, from the ion stream path.

20. The device as defined in claim 10, wherein the electrode is mounted at its position adjacent the exit opening at a position adjacent the ion stream path, and between the modulating means and the imaging surface on an electrically insulating member supported on an exterior surface of the ion chamber.

21. In an ionographic imaging device, including an electrically conductive body forming an ion chamber having an entrance opening and an exit opening and supporting an ion source therewithin, fluid jet means for creating a fluid flow through the entrance opening into the ion chamber and out the exit opening to entrain and carry ions produced at the ion source to an imaging surface moving in a process direction, modulation means at the exit opening to modulate the stream of ions moving therepast to the imaging surface imagewise fashion, means to develop the charge pattern on the imaging surface, and means for controlling the stream of ions projected towards the imaging surface to prevent charge previously deposited on the imaging surface from affecting the path of the subsequent modulated stream of ions to the imaging surface, the control means comprising:

a control electrode member positioned adjacent the exit opening, and the ion stream path, exterior to the ion chamber and between the modulating means and the imaging surface;

the control electrode member having a dielectric layer and a conductive surface layer, supported in position fixed to an exterior surface of the ion chamber, and arranged so that the dielectric layer insulates the conductive surface layer from the electrically conductive body; and a voltage source, connected to the conductive surface layer of the control electrode member, and applying a voltage thereto of magnitude and polarity sufficient to deflect the modulated stream of ions towards the imaging surface, whereby the effect of charge previously deposited on the imaging surface is prevented from affecting the path of the modulated stream of ions to the imaging surface.

22. In an ionographic imaging device, including an electrically conductive body forming an ion chamber having an entrance opening and an exit opening and supporting an ion source therewithin, fluid jet means for creating a fluid flow through the entrance opening into the ion chamber and out the exit opening to entrain and carry ions produced at the ion source to an imaging surface moving in a process direction, modulation means at the exit opening to modulate the stream of ions moving therepast to the imaging surface imagewise fashion, means to develop the charge pattern on the imaging surface, and means for controlling the stream of ions projected towards the imaging surface to prevent charge previously deposited on the imaging surface from affecting the path of the subsequent modulated stream of ions to the imaging surface, the control means comprising:

an electrode positioned adjacent the exit opening, and the ion stream path, exterior to the ion chamber and between the modulating means and the imaging surface;

the electrode having first and second portions, each portion having a dielectric layer and a conductive surface layer;

the first electrode portion fixed to an exterior surface of the ion chamber, and arranged so that the dielectric layer electrically insulates the conductive surface layer from the electrically conductive body;

the second electrode portion supported to conformably ride on the imaging surface and arranged so that the dielectric layer electrically insulates the conductive surface layer from the imaging surface; and a voltage source, connected to the conductive surface layer of each electrode member portion, and applying a voltage thereto of magnitude and polarity sufficient to deflect the modulated stream of ions towards the imaging surface, whereby the effect of charge previously deposited on the imaging surface is prevented from affecting the path of the modulated stream of ions to the imaging surface.

23. The device as defined in claim 22, wherein the electrode is arranged downstream, with respect to the imaging surface movement, from the ion stream path.

24. The device as defined in claim 22, wherein the electrode is arranged upstream, with respect to the imaging surface movement, from the ion stream path.

25. In an ionographic imaging device, including an electrically conductive body forming an ion chamber having an entrance opening and an exit opening and supporting an ion source therewithin, fluid jet means for creating a fluid flow through the entrance opening into the ion chamber and out the exit opening to entrain and carry ions produced at the ion source to an imaging surface moving in a process direction, modulation means at the exit opening to modulate the stream of ions moving therepast to the imaging surface imagewise fashion, means to develop the charge pattern on the imaging surface, and means for controlling the stream of ions projected towards the imaging surface to prevent charge previously deposited on the imaging surface from affecting the path of the subsequent modulated stream of ions to the imaging surface, the control means comprising:

a control electrode across the ion stream path, exterior to the ion chamber and between the exit opening and the imaging surface;

the control electrode having at least one opening therethrough accommodating flow of ions through the electrode to the imaging surface; and a voltage source, connected to the conductive surface layer of the control electrode member, and applying a voltage thereto of magnitude and polarity sufficient to deflect the modulated stream of ions towards the imaging surface, whereby the effect of charge previously deposited on the imaging surface is prevented from affecting the path of the modulated stream of ions to the imaging surface.

26. In an ionographic imaging device, including a body forming an ion chamber having an entrance opening and an exit opening and supporting an ion source therewithin, fluid jet means for creating a fluid flow through the entrance opening into the ion chamber and out the exit opening to entrain and carry ions produced at the ion source to an imaging surface moving in a process direction, modulation means at the exit opening to modulate the stream of ions moving therepast to the imaging surface in imagewise fashion, means to develop the charge pattern on the imaging surface, and means for controlling the stream of ions projected towards the imaging surface to prevent charge previously deposited on the imaging surface from affecting the path of the subsequent modulated stream of ions to the imaging surface, the control means comprising:

a control electrode supported adjacent the exit opening at a position adjacent the ion stream path, and between the exit opening and the imaging surface, said control electrode supported in the position adjacent the ion stream path adhered to an exterior surface of the body;

said control electrode formed from a resistive material;

a voltage source, connected to the electrode, and applying a voltage thereto of magnitude and polarity sufficient to deflect the modulated stream of ions, the deflection varying in amount with position with respect to the electrode.

27. A method of controlling blooming in an ionographic imaging device, said device including a source of ions, means for moving ions towards a moving imaging surface to create a pattern of charge thereon, modulation means to modulate the ion stream in imagewise fashion for the formation of intelligible charge patterns on the imaging surface, means to develop the charge pattern on the imaging surface, the method including the steps of:

providing a control electrode supported adjacent the ion stream path, and between the modulating means and the imaging surface; and applying a voltage to said electrode of a magnitude and polarity sufficient to deflect the modulated stream of ions in a desired direction, whereby the effect of charge previously deposited on the imaging surface is prevented from affecting the path of the modulated stream of ions to the imaging surface.

* * * * *